(No Model.)
F. E. DEGENHARDT.
STEERING DEVICE FOR VEHICLES.
No. 493,354. Patented Mar. 14, 1893.
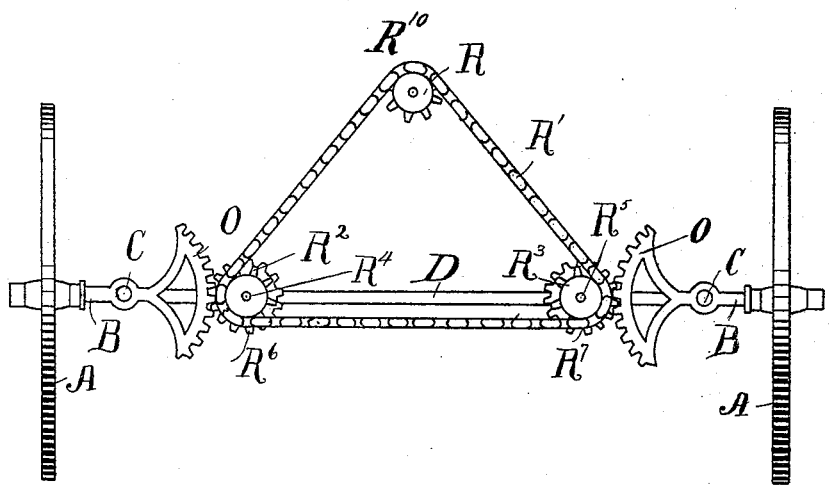
WITNESSES
INVENTOR
Frederick E. Degenhardt
BY Francis W. Parker,
ATTORNEY

UNITED STATES PATENT OFFICE.

FREDERICK E. DEGENHARDT, OF CHICAGO, ILLINOIS.

STEERING DEVICE FOR VEHICLES.

SPECIFICATION forming part of Letters Patent No. 493,354, dated March 14, 1893.

Application filed May 16, 1892. Serial No. 433,152. (No model.)

*To all whom it may concern:*

Be it known that I, FREDERICK E. DEGENHARDT, a citizen of the United States, residing at Chicago, Cook county, Illinois, have invented a new and useful Improvement in Steering Devices for Vehicles, of which the following is a specification.

My invention relates to steering devices for vehicles and has for its object especially to provide convenient means whereby the occupant of the vehicle may direct the same or steer the same at will. It is illustrated in the accompanying drawing, wherein:

A A are wheels journaled on the short axles B B, the other ends of which are provided with the arc-shaped racks O O. The short axles are journaled on the vertical pivot pins C C at the extremities of the principal axle or cross-bar D. $R^4$ and $R^5$ are similar vertical pins erected on the axle D, and each is provided with a gear wheel $R^6$ $R^7$, which gear wheels engage the racks O O. On the same shafts are the sprocket wheels $R^2$ $R^3$, which, together with the forward sprocket wheel R comprises a system of sprocket wheels, about which the chain R' passes. The sprocket wheel R is supported on a shaft $R^{10}$, which may depend from the vehicle, and is in position to be rotated.

I do not show the body of the vehicle or the associated parts, as they are not necessary to comprehend the invention, the plan view as indicated being sufficient. By rotating the shaft $R^{10}$, the driving chain is moved, and the two arc-shaped racks will be rotated, and the wheels turned together in every direction.

I claim—

In a steering device for vehicles the combination of a cross bar or permanent axle with two short axles pivoted each on a vertical pivot near one extermity of the permanent axle, wheels journaled one on one end of each of such short axles, arc-shaped racks one on the other end of each of such short axles, a gear wheel meshing with each of such racks, a series of sprocket wheels, a driving sprocket chain connecting them, two of such sprockets associated with the two gears so as to drive them and another of such sprockets placed forwardly and combined with a shaft and handle whereby the system of sprocket wheels may be operated to move the short shafts on their pivots.

FREDERICK E. DEGENHARDT.

Witnesses:
FRANCIS W. PARKER,
WALTER J. GUNTHORP.